United States Patent

Chino et al.

Patent Number: 5,030,484
Date of Patent: Jul. 9, 1991

[54] COATING METHOD

[75] Inventors: Naoyoshi Chino; Yasuhito Hiraki; Norio Shibata; Tsunehiko Sato, all of Kanagawa, Japan

[73] Assignee: Fuji Photo Film Co., Ltd., Kanagawa, Japan

[21] Appl. No.: 376,268

[22] Filed: Jul. 3, 1989

[30] Foreign Application Priority Data

Jul. 4, 1988 [JP] Japan ................ 63-164901

[51] Int. Cl.⁵ .......................... B05D 1/18; B05D 5/12
[52] U.S. Cl. .................... 427/434.3; 427/131
[58] Field of Search ................ 427/127–132, 427/48, 434.3; 428/900, 694, 695

[56] References Cited

U.S. PATENT DOCUMENTS 2,901,770  9/1959  Beck ........................... 18/13

FOREIGN PATENT DOCUMENTS 338977    2/1955  Japan .
56-12937  3/1981  Japan .
58-109162 6/1983  Japan .
61-111168 5/1986  Japan .

Primary Examiner—Bernard Pianalto
Attorney, Agent, or Firm—Sughrue, Mion, Zinn, Macpeak & Seas

[57] ABSTRACT

A coating method and an extrusion-type coating head in which turbulence at the junction between two flows of coating materials is prevented to provide multi-layer simultaneous coating over a wide range of coating rates and with a good coating quality. An intermediate block is sandwiched between a rear block defining a back edge and a front block defining a doctor edge. Two coating flows pass through slits formed on either side of the intermediate block, joining at the top end of the intermediate block and flowing together into a short slot extending between the end of the intermediate block and the outlet of the head.

12 Claims, 2 Drawing Sheets

COATING METHOD

BACKGROUND OF THE INVENTION

The present invention relates to a method for simultaneously applying a plurality of coating solutions onto a moving support, thereby to form multiple layers of coating solutions thereon. More particularly, the invention pertains to a method for manufacturing a multi-layer magnetic recording medium by simultaneous coating.

Recently, magnetic recording media have been improved in recording density and decreased in thickness. In association with this technical advancement, the current tendency is to use a multi-layer magnetic recording medium instead of a single-layer magnetic recording medium.

In order to improve the adhesion of a magnetic layer or back layer and its support, an undercoating layer is provided on the support. That is, in order to manufacture magnetic recording media, it is necessary to form two or more layers on one support.

In manufacturing such a multi-layer magnetic recording medium, coating and drying are carried out after each layer is formed on the support. That is, coating and drying operations must be repeatedly carried out to manufacture a single multi-layer magnetic recording medium. Such a method though is low in productivity and high in the cost of required equipment.

Hence, there has been a strong demand for the provision of a method, hereinafter referred to as "a multi-layer coating method", for forming a plurality of layers on a support in one coating and drying cycle.

Examples of known magnetic recording medium coating methods are roll coating, gravure coating and extrusion-plus-doctor coating methods. In these coating methods, however, it is impossible to simultaneously form a plurality of film layers on one support because of the shear stress which is produced during the coating operation.

On the other hand, a slide coating method using a slot has been disclosed, as one example of a multi-layer coating method, for the manufacture of photographing photosensitive materials. Japanese Published Patent Application No. 12937/1981 discloses a multi-layer coating method for magnetic recording materials which uses a coating apparatus with a slide. However, in the manufacture of magnetic recording media, the coating solutions have a high viscosity and dry quickly, being organic solvent dispersion solutions which are liable to aggregate, and are hence this method is not suitable for high-speed film layer coating operations.

In addition, a variety of extrusion-type coating methods have been disclosed in the art; however, almost all are limited to forming a single film layer on a support.

Japanese Unexamined Published Patent Application (OPI) No. 109162/1983 discloses a coating method in which an extrusion coating head is pressed against a web (support) is employed to form a plurality of film layers thereon. However, the method is advantageous in the following points: (1) It is necessary to provide a doctor edge for each layer. The edges are liable to wear, and it is rather difficult to set the edges at the proper position. (2) The layers are formed separately, and therefore the stable coating range of each layer is small. Particularly the stable coating range of the lowermost layer (the layer directly above the support) is small.

On the other hand, Japanese Published Patent Application No. 8977/1958 and Japanese Patent Application (OPI) No. 111168/1986 disclose a method in which a plurality of coating solutions are allowed to meet together in a hopper (pocket) or slot inlet and are then extruded. These methods are still disadvantageous in the following points: (1) In the case where the slot inlet is divided with a partition board or the like, it is technically difficult to make the gap between the partition board and the slot uniform in the widthwise direction. Accordingly, it is impossible to make the coating thickness uniform in the widthwise direction. (2) When coating solutions differing in viscosity are allowed to flow over a long distance after meeting, the solutions may be mixed in the interface therebetween. Thus, the flow of the solutions becomes unstable.

U.S. Pat. No. 1,901,700 discloses a coating method in which an intermediate edge having a sharp or flat end face is arranged in the slot to apply two coating solutions to the support. In this case, since the intermediate edge is made of an ordinary material, small flaws several to several tens of microns in length are inevitably formed on the end face. As a result, strips are formed on the product. In the case where an intermediate edge having the flat end face is used, depending on the width of the flat end surface, the width of the solution path may change abruptly, as a result of which vortices are formed in the stream of coating solutions, whereby the two solutions are mixed, spoiling the interface therebetween. Hence, the resultant product also has strips on its surface.

The above-described difficulties become more significant as the coating speed increases and the coating thickness is reduced.

SUMMARY OF THE INVENTION

Accordingly, an object of the present invention is to eliminate the above-described difficulties accompanying a conventional multi-layer coating method. More specifically, an object of the invention is to provide a multi-layer coating method in which a plurality of film layers can be applied to the support at high speed and the resultant product is uniform in surface quality, having no defects such as stripes, and the interface of the coating solutions is maintained uniform.

The foregoing and other objects of the invention have been achieved by the provision of a coating method in which, with an extrusion-type head having a back edge and a doctor edge pressing against a support which is being conveyed, coating solutions at least one of which is a magnetic solution are simultaneously applied onto the support to form at least two layers of coating solution thereon, in which, according to the invention, the coating solutions meet at an intermediate block arranged in the slot of the head near the outlet of the slot in such a manner as to prevent the coating solutions from being mixed at the interface thereof.

In the coating method of the invention, a plurality of coating solutions of different viscosities meet in the slot, thus forming multiple layers of coating solutions. However, in order to eliminate the difficulty that the interface of the coating solutions is made irregular by the flowing of the multiple layers over a long distance in the slot, the solution meeting position is suitably selected, as a result of which the coating solution layers are not mixed. In addition, the hardness and configuration of the intermediate block are suitably selected in order to perform a simultaneous multi-layer coating operation with high accuracy.

DESCRIPTION OF THE PREFERRED EMBODIMENTS

Figure 1:
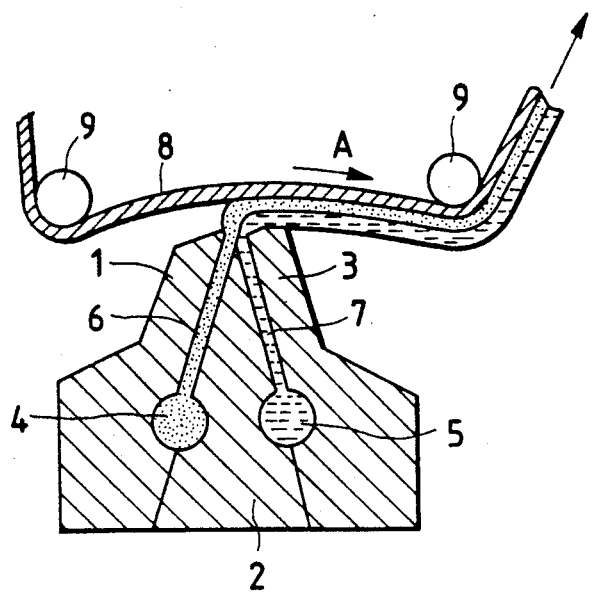
FIG. 1 is a diagram showing an example of an extrusion-type head according to the invention.

Preferred embodiments of the present invention will be described with reference to the accompanying drawings. FIG. 1 is a diagram showing in cross section an extrusion-type head constructed in accordance with a first preferred embodiment of the invention.

In FIG. 1, a reference numeral 1 designates a rear block defining a back edge; 3, a front block having a doctor edge; and 2, an intermediate block. At least the front end of the intermediate block 2 is made of a material having a Rockwell scale A hardness greater than 80, for example, carbon steel, nitride steel, cement steel, cemented carbide, or ceramic. Magnetic solutions of different viscosities, namely, coating solutions 6 and 7, are supplied into pockets 4 and 5 by respective pumps (not shown), and are passed through narrows slits, meeting in the slot formed at the ends of the slits. The coating solutions are then applied onto a support (web) 8 which is conveyed in the indicated direction.

The extrusion-type head will be further described with reference to FIG. 2.

Figure 2:
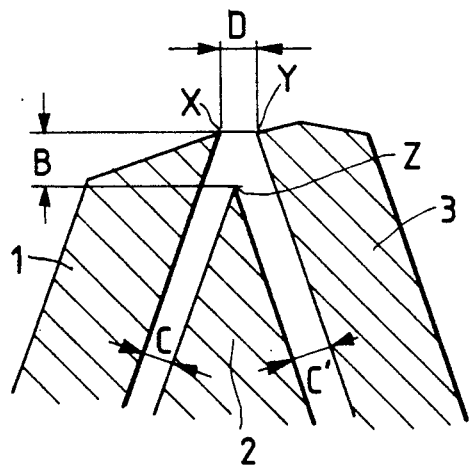
FIG. 2 is an enlarged view of the end portion of the extrusion-type head illustrated in FIG. 1.

FIG. 2 is an enlarged view showing the region where the two coating solutions meet. In FIG. 2, reference character Z indicates the end of the intermediate block 2; X, the top of the back edge; and Y, the top of the doctor edge. The end Z must be located a distance B below (in FIG. 2) the line which passes through the tops X and Y. The distance B should be as small as possible. If the two coating solutions of different viscosities after meeting are caused to flow in the form of a multi-layer over a long distance in the slot while under pressure, the interface of the two coating solutions will become irregular, as a result of which the two solutions may be mixed at the interface. However, if the solution meeting point is set extremely close to the outlet of the slot, such mixing is satisfactorily prevented. The distance B should be in a range of from 0.01 mm to 20 mm, preferably 0.01 to 5 mm, more preferably 0.01 to 1 mm. The distance B should be determined according to the viscosity and flow rates of the two coating solutions.

Further in FIG. 2, reference character C designates the width of the slit in which the coating solution forming the lower layer flows; C', the width of the slit in which the coating solution forming the lower layer flows; and D, the width of the slot in which flows the multi-layer formed by the upper and lower layers after they have met. The widths C, C' and D should be in a range of from 0.03 mm to 3 mm depending on the viscosity and flow rates of the coating solutions. In this connection, it is preferable that the widths C and C' be so selected that the ratio of the flow rates in the respective slits is in a range of 1:1 to 5:1 in order to prevent turbulence at the interface where the two coating solution meet.

Figure 3:
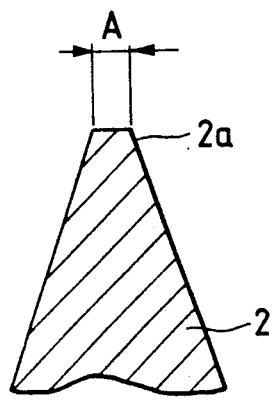
FIGS. 3, 4 and 5 are sectional views showing different examples of an intermediate block used in the extrusion-type head according to the invention.
Figure 4:
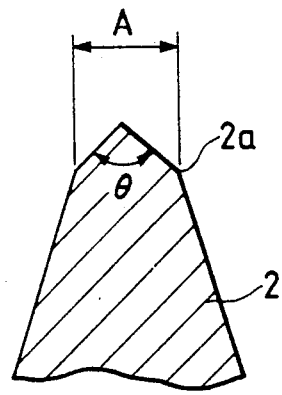
Figure 5:
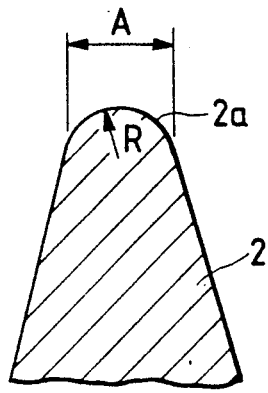

FIGS. 3, 4 and 5 are enlarged sectional views showing examples of the end portion of the intermediate block 2.

In the invention, at least the end portion 2a of the intermediate block 2 is made of a material having a Rockwell scale A hardness of 80 or higher. In the case where the end portion 2a is flat as shown in FIG. 3, the width of the flat surface is less than 1 mm, preferably less than 0.5 mm. In the case where the end portion 2a is sharply tapered as shown in FIG. 4, the taper angle θ is more than 25°, preferably more than 50°. In, the case where the end portion 2a is round as shown in FIG. 5, the radius R is less than 1 mm, preferably less than 0.5 mm.

The end portion 2a of the intermediate block 2, by having one of the configurations described above, eliminates the difficulty of the two coating solutions being made turbulent at the point where they meet to form, for instance, vortices. In other words, the end portion thus formed allows the two coating solution to smoothly meet, with the result that the upper and lower layers are not mixed and the resultant multi-layer is satisfactory.

In a coating apparatus with the extrusion type head thus constructed, the above-described support 8 (FIG. 1) is laid over a conveyance guide structure such as guide rollers 9 under a substantially constant tension in such a manner that the support 8 curves slightly in the direction of its thickness. The support 8 is thus set close to the head with the aid of an extruder support mechanism (not shown) in such a manner that it curves substantially parallel to the downstream edge surface of the doctor edge. Under this condition, a solution supplying system is operated to supply the coating solutions 6 and 7 at predetermined flow rates. The coating solutions 6 and 7 thus supplied are extruded to the outlet of the slot through the pockets 4 and 5 and the slits with a uniform flow rate and pressure distribution over the width of the support 8.

As described above, the head is slightly spaced from the surface of the support 8. Therefore, the extruded coating solutions 6 and 7, while forming a bead on the edge surface of the back edge, are caused to flow along the surface of the support, which is continuously conveyed in the direction of the arrow A, in such a manner as to push the support 8 and the doctor edge away from each other.

As to details of the extrusion apparatus not discussed above, conventional techniques may be used. That is, the support materials and the dimensions of the back and doctor edges, the angles at which the support enters and leaves the coating head, and the configuration of the support can be the same as in a conventional case.

Appropriate conventional techniques are disclosed in Japanese Unexamined Published Patent Applications (OPIs) Nos. 84771/1982, 104666/1983, 109162/1983, and 238179/1985.

The invention has the following novel effects:

In the extrusion of a multi-layer of coating solutions differing in viscosity, the provision of the intermediate block prevents adverse effects on the flows of the coating solutions in the region where the coating solutions meet, and it allows the solution meeting position to be arranged extremely close to the slot outlet. Therefore, in the coating method of the invention, various factors which could lead to instabilities in the interface of the coating solution layers are eliminated. As a result, the high-speed film coating performance is improved, the resultant coating is even and it has no stripes or the like, and the stable multi-layer simultaneous coating range can be increased, which contributes greatly to an improvement of productivity. Furthermore, in the invention, since the intermediate block is made of a cemented material, breaking and burring of the end portion are essentially eliminated, and the coating conditions are improved accordingly.

As conducive to a full understanding of the invention, specific examples thereof will be described.

EXAMPLE NO. 1

The first layer (the coating solution 6 in FIG. 1) was a dispersion solution containing carbon and having a composition as shown in Table 1, and the second layer was a dispersion solution of magnetic material having a composition also as shown in Table 1.

The supports were made of polyethylene terephthalate (PET) webs 15 μm and 75 μm in thickness. The first and second layers were applied to the webs with different coating rates under conditions that the coating width was 400 mm, the coating speed 200 m/min, and the tension 25 kg/m (width).

In the extrusion-type head, the thickness of the back edge and the doctor edge was 2 mm, the slit widths C and C' indicated in FIG. 1 were both 0.2 mm, the width D was approximately 0.4 mm, the distance B from the slit outlet to the end of the intermediate block was 0.1 mm, and the thickness A shown in FIG. 3 was 0.1 mm.

For comparison, the coating of a support according to the method disclosed in Japanese Unexamined Published Patent Application No. 109161/1983 was tested.

TABLE 1

| First layer coating solution composition: | |
|---|---|
| Carbon black ("Sebaruco MICT"), average grain size 250 μm | 200 parts by weight |
| "Nipporan - 730" (manufactured by Nippon Polyurethane Co.) | 80 parts by weight |
| Phenoxy resin PKH-1 (manufactured by Union Carbide Co.) | 35 parts by weight |
| Oreic acid copper | 1 part by weight |
| Methyl ethyl ketone | 500 parts by weight |

TABLE 2

| Second layer coating solution composition (magnetic material dispersion solution): | |
|---|---|
| CO containing magnetic iron oxide ($S_{BET}$ 35 m$^2$/g) | 100 parts by weight |
| Nitrocellulose | 10 parts by weight |
| Polyurethan resin "Nipporan 2304" (manufactured by Nippon Polyurethane Co.) | 8 parts by weight |
| Polyisocyanate | 8 parts by weight |
| $Cr_2O_3$ | 2 parts by weight |
| Carbon black (average grain diameter 20 μm) | 2 parts by weight |
| Stearic acid | 1 part by weight |
| Butyl stearate | 1 part by weight |
| Methyl ethyl ketone | 300 parts by weight |

TABLE 3

| First layer coating layer cc/sq.m. | Second layer coating rate cc/sq.m. | | | | | | |
|---|---|---|---|---|---|---|---|
| | 3 | 10 | 15 | 20 | 25 | 30 | 40 |
| 3 | ○ | ○ | ○ | ○ | ○ | ○ | ○ |
| 10 | ○ | ○ | ○ | ○ | ○ | ○ | ○ |
| 15 | ○ | ○ | ○ | ○ | ○ | ○ | ○ |
| 20 | ○ | ○ | ○ | ○ | ○ | ○ | ○ |
| 25 | ○ | ○ | ○ | ○ | ○ | ○ | ○ |
| 30 | ○ | ○ | ○ | ○ | ○ | ○ | X |
| 40 | ○ | ○ | ○ | ○ | ○ | X | X |

Legend:
○ Satisfactory multi-layer coating
X Unsatisfactory multi-layer coating

Table 3 indicates the results or coating operations in which the combined coating rates of the first and second layers were in a range of 6 to 80 cc/m$^2$. As is apparent from Table 3, the coating operation can be carried satisfactorily out when the sum of the coating rates of the first and second layers is in a range of 6 to 65 cc/m$^2$.

On the other hand, the method disclosed by Japanese Published Unexamined Patent Application No. 109162/1983 was tested using coating rates of 3 cc/m$^2$ and 10 cc/m$^2$ for the first layer and coating rates of 3 cc/m$^2$ to 30 cc/m$^2$ for the second layer. In this test, it was impossible to satisfactorily form the first layer, and accordingly the desired multi-layer was not formed.

EXAMPLE NO. 2

Tests were carried out with the thickness A and curvature R of the end portion 2a of the intermediate block 2 (FIG. 5) varied.

The dimensions A and R were both set to 0.1 mm or less, 0.5 mm, 1 mm, and 2 mm. The coating rates of the first and second layers were both set to 15 cc/m$^2$. A 75 μm base was employed. The value B in FIG. 2 was changed according to the dimension A. The other conditions were the same as those in Example No. 1 described above.

The results of the tests were as follows: When both of the dimensions A and R were 0.1 mm or less, the resultant layer surface was satisfactory. When both A and R were 1 mm, stripes were found on the resultant layer surface, but the product was acceptable in practical use.

On the other hand, when A and B were set to 2 mm, a number of stripes were formed thereon, and the product was not acceptable in practical use. In the case where the dimensions R was set to 2 or more, not only stripes but also wide irregular patterns were formed on the layer surface, and the product was not fit for practical use.

EXAMPLE NO. 3

For this test, the angle θ of the sharp end portion 2a of the intermediate block 2 shown in FIG. 4 and the hardness of the end portion were changed. The coating conditions were the same as those in Example No. 1 above. The tests results were as in the following Table 4:

TABLE 4

| Material Rockwell hardness A (60 kg) | Angle (θ) | Configuration of manufactured end portion | Results of coating |
|---|---|---|---|
| 75 | 50° | Many flaws and burrs | Many stripes |
| 80 | 50° | No flaws or burrs | No stripes |
| 85 | 20° | Many flaws | Many stripes |
| | 50° | No flaws | No stripes |

TABLE 4-continued

| Material Rockwell hardness A (60 kg) | Angle (θ) | Configuration of manufactured end portion | Results of coating |
|---|---|---|---|
| | 90° | No flaws | No stripes |
| | 120° | No flaws | No stripes |
| 87 | 50° | No flaws | No stripes |
| 90 | 50° | No flaws | No stripes |

EXAMPLE NO. 4

The composition of the second layer was as indicated in the following Table 5, and that of the first layer was obtained by changing the HC of Co-r-FeOx (magnetic recording material) in Table 4 to 600 Oe.

With the coating rates of the first and second layers in a range of 10 to 30 cc/m², tests were carried out in the same manner as in the above-described Example No. 1.

The results of the tests were satisfactory. That is, the surface of the coating was satisfactory in quality.

As is apparent from the above-described example, according to the invention, a multi-layer simultaneous coating operation can be carried out at a wide range of coating rates, and, in the coating operation, thin film layers can be formed at higher speed, and the resultant multi-layer is satisfactory in quality.

TABLE 5

| | |
|---|---|
| Co-r-FeOx (Hc = 700 Oe) | 100 parts by weight |
| Copolymer of vinyl chloride, vinyl acetate and vinyl alcohol (92:3:5, polymerization degree 400) | 20 parts by weight |
| Polyester polyurethane (molecular weight 50,000) | 5 parts by weight |
| Oleic acid (industrial) | 2 parts by weight |
| Dimethyl polysiloxane (polymerization degree 60) | 0.2 part by weight |
| Carbon (grain size 10 mμ) | 1.0 part by weight |
| α-Al₂O₃ (grain size 0.5 μm) | 1.0 part by weight |
| Methyl ethyl ketone | 250 parts by weight |

EXAMPLE NO. 5

Tests were carried out with the same coating solutions as in Example No. 4. In these tests, the distance B between the slot outlet of an extrusion type head shown in FIG. 6 and the top of the intermediate block 2 were changed to different values. The configuration of the end portion of the intermediate block was as shown in FIG. 4. The web used as 15 μm in thickness and 500 mm in width, and the coating speed was 200 m/min.

Figure 6A:
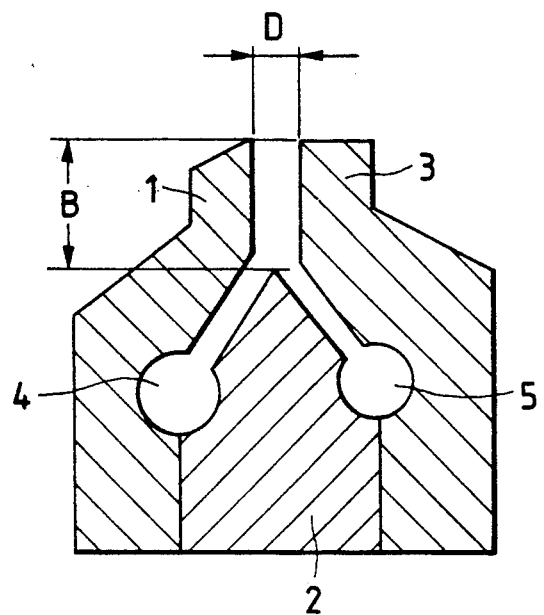
FIGS. 6A and 6B are sectional views showing other examples of extrusion-type heads according to the invention.
Figure 6B:
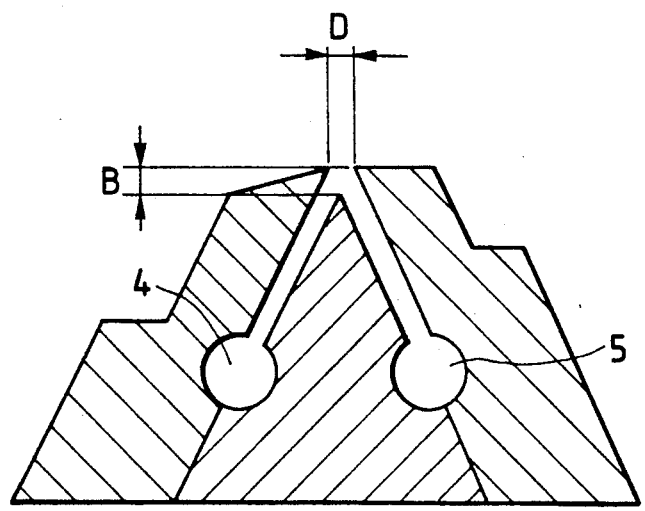

The coating rates of the first and second layers were set to 20 cc/m² and 10 cc/m², respectively. The width D of the slot was a constant 0.5 mm. When the distance B was 3 mm or more, the extrusion-type head as shown in FIG. 6 was used, and when the distance B was 1 mm or less, an extrusion-type head as shown in FIG. 6B was used. The results of the tests are as indicated in Table 6 below:

TABLE 6

| B (mm) | Multi-layer surface | Evaluation |
|---|---|---|
| 30 | No dual layer formed | X |
| 20 | Dual layer formed, but some stripes found | Δ |
| 10 | " | Δ |
| 5 | " | ΔO |
| 1 | Satisfactory | O |

TABLE 6-continued

| B (mm) | Multi-layer surface | Evaluation |
|---|---|---|
| 0.05 | " | O |
| 0.01 | " | O |

Legend:
O Satisfactory
X Unsatisfactory
Δ Average

What is claimed is:

1. A coating method comprising the steps of:
   pushing an extrusion-type coating head having a back edge portion and a doctor edge portion against a support;
   conveying said support in a direction substantially parallel to a surface of said doctor edge portion;
   supplying two coating solutions to respective inlets of said coating head;
   passing said coating solutions along opposite surface of an intermediate block arranged in said coating head, said intermediate block being made of a material having a Rockwell scale A hardness of at least 80;
   joining said solutions in said coating head at a blunt end portion of said intermediate block at a position recessed from an outlet of a slot formed in said coating head in such a manner as to prevent mixing of said coating solutions at an interface thereof; and
   extruding the joined coating solutions onto said support through said slot.

2. The coating method as claimed in claim 1, wherein a distance from a top of said end portion to a line joining tops of said doctor and back edges is in a range of 0.01 to 1.

3. The coating method as claimed in claim 1, wherein said end portion has a flat end face having a width of less than 1 mm.

4. The coating method as claimed in claim 1, wherein said end portion has a flat end face having a width of less than 0.5 mm.

5. The coating method as claimed in claim 1, wherein said end portion is tapered to form a taper angle of at least 25°.

6. The coating method as claimed in claim 1, wherein said end portion is tapered to form a taper angle of at least 50°.

7. The coating method as claimed in claim 1, wherein said end portion is rounded with a radius of curvature of no more than 1 mm.

8. The coating method as claimed in claim 1, wherein said end portion is rounded with a radius of curvature of no more than 0.5 mm.

9. The coating method as claimed in claim 1, wherein a distance from a top of said end portion to a line joining tops of said doctor and back edges is in a range of 0.01 to 20 mm.

10. The coating method as claimed in claim 1, wherein a distance from a top of said end portion to a line joining tops of said doctor and back edges is in a range of 0.01 to 5 mm.

11. The coating method as claimed in claim 1, wherein widths of flows of each of said coating solutions at positions prior to said coating solutions meeting and a width of a multi-layer flow produced after said coating solutions meet are each in a range of 0.03 mm to 3 mm.

12. The coating method as claimed in claim 11, wherein a ratio of flow rates between flows of each of said coating solutions is in a range of 1:1 to 5:1.

* * * * *